(12) United States Patent
Obradovic et al.

(10) Patent No.: US 12,047,299 B2
(45) Date of Patent: Jul. 23, 2024

(54) COMPUTER PROGRAM AND METHOD FOR DATA COMMUNICATION

(71) Applicant: Siemens Aktiengesellschaft, Munich (DE)

(72) Inventors: Dragan Obradovic, Ottobrunn (DE); Günter Steindl, Poppenricht (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 417 days.

(21) Appl. No.: 17/442,837

(22) PCT Filed: Mar. 11, 2020

(86) PCT No.: PCT/EP2020/056477
§ 371 (c)(1),
(2) Date: Sep. 24, 2021

(87) PCT Pub. No.: WO2020/193138
PCT Pub. Date: Oct. 1, 2020

(65) Prior Publication Data
US 2022/0191147 A1  Jun. 16, 2022

(30) Foreign Application Priority Data
Mar. 25, 2019  (EP) ..................... 19164886

(51) Int. Cl.
*H04L 47/28* (2022.01)
*H04L 45/00* (2022.01)
*H04L 45/48* (2022.01)

(52) U.S. Cl.
CPC .............. *H04L 47/28* (2013.01); *H04L 45/22* (2013.01); *H04L 45/48* (2013.01)

(58) Field of Classification Search
CPC ...... G05B 19/4185; G05B 2219/31218; H04L 12/40; H04L 45/123; H04L 45/124;
(Continued)

(56) References Cited

U.S. PATENT DOCUMENTS 5,233,604 A * 8/1993 Ahmadi .................. H04L 45/12
370/255
5,740,172 A * 4/1998 Kang ..................... H04L 45/22
370/392
(Continued)

FOREIGN PATENT DOCUMENTS

AU     2017383561 B2 * 11/2022 ............. H04L 12/66
CA        2089789 A1 * 10/1993
(Continued)

OTHER PUBLICATIONS

Wang, S. "Modeling and Analysis of Vertical Noise Coupling Between Clock Tree and Channel Routing Wire in 3D Mixed Signal Integration", 2015 IEEE International Interconnect Technology Conference and 2015 IEEE Materials for Advanced Metallization Conference (IITC/MAM), pp. 79-82, Dec. 12, 2015.
(Continued)

*Primary Examiner* — Eric Nowlin
(74) *Attorney, Agent, or Firm* — Cozen O'Connor

(57) ABSTRACT

A computer program and method for data communication in a network having a plurality of network nodes, via which method data packets are to be transferred between communication partners over protected connections, wherein the data packets originate from at least two different sending communication partners, or senders, and wherein the sending frequencies of at least two senders, at which the senders send data packets that are to be transferred over a protected connection, differ from one another, and the sending frequencies and/or variables representing same being taken into
(Continued)

account when finding a path for the transfer of the data packets of at least one protected connection.

6 Claims, 5 Drawing Sheets

(58) Field of Classification Search
CPC ........ H04L 45/22; H04L 45/48; H04L 47/28; H04L 2012/40221; Y02P 90/02
See application file for complete search history.

(56) References Cited

U.S. PATENT DOCUMENTS

| | | | | |
|---|---|---|---|---|
| 6,347,091 B1* | 2/2002 | Wallentin | ............... | H04W 28/18 370/464 |
| 6,542,468 B1* | 4/2003 | Hatakeyama | ....... | H04L 63/0281 370/352 |
| 6,865,160 B1* | 3/2005 | Bare | ............... | H04L 45/24 370/256 |
| 7,453,847 B2* | 11/2008 | Wallentin | ............... | H04W 28/16 370/352 |
| 7,774,461 B2* | 8/2010 | Tanaka | ............... | H04L 45/26 709/224 |
| 8,139,491 B2* | 3/2012 | Nakata | ............... | H04L 47/34 370/231 |
| 8,331,227 B2* | 12/2012 | Tanaka | ............... | H04L 45/26 370/229 |
| 8,339,987 B2* | 12/2012 | Tanaka | ............... | H04L 45/38 709/224 |
| 8,693,478 B2* | 4/2014 | Deshpande | ............... | H04L 45/48 370/256 |
| 8,892,769 B2* | 11/2014 | Pratt, Jr. | ............... | H04L 45/34 709/238 |
| 8,914,560 B2* | 12/2014 | Katoh | ............... | G06F 13/12 370/413 |
| 9,363,168 B2* | 6/2016 | Enyedi | ............... | H04L 45/16 |
| 9,602,379 B2* | 3/2017 | Hui | ............... | H04L 43/0876 |
| 9,979,515 B2* | 5/2018 | Mirsky | ............... | H04L 1/24 |
| 10,044,600 B2* | 8/2018 | Zhang | ............... | H04L 45/122 |
| 10,218,629 B1* | 2/2019 | An | ............... | H04L 45/22 |
| 10,630,592 B2* | 4/2020 | Hu | ............... | H04L 45/28 |
| 10,630,604 B2* | 4/2020 | Bruckner | ............... | H04L 41/12 |
| 10,666,499 B2* | 5/2020 | Subbiah | ............... | H04L 41/0654 |
| 10,666,580 B1* | 5/2020 | Callaghan | ............... | H04L 49/30 |
| 10,904,150 B1* | 1/2021 | Kampeas | ............... | H04L 45/124 |
| 11,038,634 B2* | 6/2021 | Mirsky | ............... | H04L 1/24 |
| 11,159,435 B2* | 10/2021 | Kande | ............... | H04L 45/02 |
| 11,356,365 B2* | 6/2022 | Maallem | ............... | H04W 40/22 |
| 11,438,265 B2* | 9/2022 | Sze | ............... | H04L 43/0882 |
| 11,510,128 B2* | 11/2022 | Matsuura | ............... | H04W 40/28 |
| 11,516,695 B2* | 11/2022 | Thorsén | ............... | H04W 28/065 |
| 2006/0067330 A1* | 3/2006 | Schollmeier | ......... | H04L 45/243 370/395.31 |
| 2007/0002748 A1* | 1/2007 | Nakata | ............... | H04L 12/56 370/238 |
| 2009/0231996 A1 | 9/2009 | Lauther | | |
| 2010/0172243 A1* | 7/2010 | Nakata | ............... | H04L 47/10 370/237 |
| 2010/0296392 A1* | 11/2010 | Tanaka | ............... | H04L 12/4645 370/217 |
| 2010/0309811 A1* | 12/2010 | Tanaka | ............... | H04L 45/02 370/253 |
| 2010/0318918 A1* | 12/2010 | Mahmoodshahi | .. | H04L 41/5077 715/752 |
| 2011/0216656 A1* | 9/2011 | Pratt, Jr. | ............... | H04L 45/34 370/400 |
| 2012/0170489 A1* | 7/2012 | Farkas | ............... | H04L 45/04 370/256 |
| 2013/0036244 A1* | 2/2013 | Katoh | ............... | G06F 13/12 710/38 |
| 2013/0242998 A1* | 9/2013 | Deshpande | ............ | H04L 45/48 370/392 |
| 2014/0016457 A1* | 1/2014 | Enyedi | ............... | H04L 45/22 370/225 |
| 2015/0026494 A1 | 1/2015 | Bainbridge et al. | | |
| 2015/0131443 A1 | 5/2015 | Noëbauer et al. | | |
| 2015/0381324 A1* | 12/2015 | Mirsky | ............... | H04L 45/00 370/241.1 |
| 2016/0315847 A1* | 10/2016 | Zhang | ............... | H04L 45/56 |
| 2017/0295099 A1* | 10/2017 | Murphy | ............... | H04L 47/125 |
| 2018/0123960 A1* | 5/2018 | Hu | ............... | H04L 47/21 |
| 2018/0234215 A1* | 8/2018 | Mirsky | ............... | H04L 45/50 |
| 2020/0099573 A1* | 3/2020 | Subbiah | ............... | H04L 67/1097 |
| 2020/0236043 A1* | 7/2020 | Sze | ............... | H04L 43/0882 |
| 2021/0037409 A1* | 2/2021 | Thorsén | ............... | H04L 45/245 |
| 2021/0234789 A1* | 7/2021 | Meredith | ............... | H04L 45/48 |
| 2022/0150163 A1* | 5/2022 | Nguyen | ............... | H04L 43/16 |
| 2022/0191147 A1* | 6/2022 | Obradovic | ............ | H04L 45/124 |
| 2022/0255873 A1* | 8/2022 | Li | ............... | H04L 47/28 |
| 2023/0275827 A1* | 8/2023 | Yadav | ............... | H04L 45/50 709/238 |

FOREIGN PATENT DOCUMENTS

| | | | | |
|---|---|---|---|---|
| CN | 1728713 | | 2/2006 | |
| CN | 101416456 A | * | 4/2009 | ............ H04L 45/00 |
| CN | 101416456 B | * | 10/2014 | ............ H04L 45/00 |
| CN | 104285423 | | 1/2015 | |
| CN | 105915467 | | 8/2016 | |
| CN | 107005481 A | * | 8/2017 | ............... H04L 1/24 |
| CN | 107005481 B | * | 9/2020 | ............... H04L 1/24 |
| CN | 113678409 B | * | 10/2022 | ......... G05B 19/4185 |
| DE | 102005036064 | | 2/2007 | |
| EP | 0568477 A2 | * | 11/1993 | |
| EP | 0568477 B1 | | 5/2000 | |
| EP | 2001174 A1 | * | 12/2008 | ............ H04L 45/00 |
| EP | 2555121 A1 | * | 2/2013 | ............ G06F 13/12 |
| EP | 2704370 A1 | * | 3/2014 | ............... H04L 1/22 |
| EP | 2555121 B1 | * | 4/2014 | ............ G06F 13/12 |
| EP | 2759896 | | 7/2014 | |
| EP | 2692097 B1 | * | 8/2015 | ............ H04L 45/16 |
| EP | 3162006 A1 | * | 5/2017 | ............... H04L 1/24 |
| EP | 3162006 B1 | * | 4/2018 | ............... H04L 1/24 |
| EP | 3410650 A1 | * | 12/2018 | ............... H04L 1/24 |
| EP | 3454222 | | 3/2019 | |
| EP | 3668051 A1 | * | 6/2020 | |
| EP | 3716537 A1 | * | 9/2020 | ......... G05B 19/4185 |
| EP | 3758310 A1 | * | 12/2020 | |
| EP | 3906642 B1 | * | 11/2022 | ......... G05B 19/4185 |
| JP | 2793467 B2 | * | 9/1998 | |
| JP | 4488256 B2 | * | 6/2010 | ............ H04L 45/00 |
| JP | 2013037486 A | * | 2/2013 | ............ G06F 13/12 |
| JP | 5741301 B2 | * | 7/2015 | ............ G06F 13/12 |
| JP | 7173587 B2 | * | 11/2022 | ............ H04L 12/66 |
| KR | 20080109786 A | * | 12/2008 | |
| RU | 2586855 C2 | * | 6/2016 | ............ H04L 45/16 |
| WO | WO-2004077756 A1 | * | 9/2004 | ............ H04L 45/02 |
| WO | WO-2007111331 A1 | * | 10/2007 | ............ H04L 45/00 |
| WO | WO-2016001805 A1 | * | 1/2016 | ............... H04L 1/24 |
| WO | WO-2019149603 A1 | * | 8/2019 | ......... H04L 41/0663 |
| WO | WO-2020193138 A1 | * | 10/2020 | ......... G05B 19/4185 |
| WO | WO-2020211921 A1 | * | 10/2020 | |

OTHER PUBLICATIONS

Wenling, et al. "Study and Performance Analysis of RPL Routing Protocol in WSN", Network and Communication, pp. 63-66, Mar. 31, 2017.
PCT International Search Report dated Jun. 9, 2020 based on PCT/EP2020/056477 filed Mar. 11, 2020.
EP Search Report dated Jul. 17, 2019 based on EP19164886 filed Mar. 25, 2019.

* cited by examiner

COMPUTER PROGRAM AND METHOD FOR DATA COMMUNICATION

CROSS-REFERENCE TO RELATED APPLICATIONS

This is a U.S. national stage of application No. PCT/EP2020/056477 filed 11 Mar. 2020. Priority is claimed on European Application No. 19164886.4 filed 25 Mar. 2019, the content of which is incorporated herein by reference in its entirety.

BACKGROUND OF THE INVENTION

1. Field of the Invention

The invention relates to a computer program and a method for data communication in an industrial network having a plurality of network nodes, in which method data packets are to be transferred between communication partners over protected connections, where the data packets originate from at least two different sending communication partners, or senders, and where the sending frequencies of at least two senders, with which the senders send data packets that are to be transferred over a protected connection each differ from one another.

2. Description of the Related Art

In industrial automation systems, a multiplicity of components, e.g., one or more control units, distributed IO devices comprising or in the form of sensors or actuators, or peripheral devices, are communicatively interconnected via a network. The communication in this network can occur in accordance with the communication protocol known as PROFINET, for example. PROFINET (process field network) is the open industrial Ethernet standard for automation, from the PROFIBUS User Organization (PNO: PROFIBUS-Nutzerorganisation e.V.).

The exchange of data between the control unit(s), in particular IO controller(s), and the distributed IO devices usually occurs via cyclical communication, where data packets are transferred cyclically, in particular in real time. For the purpose of such communication, the continuous time is broken down into consecutive cyclical time slots of identical duration, such that the natural continuous time is discretized. The time segments produced as a result of this breakdown are referred to in the following as send clocks or network clocks, and as send clock time or network clock time. The send clock or the send clock time is usually defined in the context of the configuration, in particular by the user.

DE 10 2005 036064 A1 discloses a method for data communication, where data packets are to be transferred between communication partners over protected connections. The data packets originate from different senders, where the sending frequencies of at least two senders, with which the senders send data packets that are to be transferred over a protected connection in each case, differ from one another. When determining a path for the transfer of the data packets, the sending frequencies or variables representing the sending frequencies of the protected connections are taken into account.

In particular, in the event that packets of different senders are not generated at the same rate, a reduction ratio can be configured. The reduction ratio specifies how often the cyclical IO messages are exchanged. In particular, the whole-number multiple of the send clock is used by the (respective) sender for the purpose of sending packets.

A reduction ratio of 1 means that IO messages are sent in each send clock. A reduction ratio of 16 means, for example, that sending only occurs once in every 16 send clocks. If the send clock is fixed at 250 microseconds, for example, but a communication partner only generates new data every millisecond, then a reduction ratio of 4 is appropriately selected.

Each configured IO device can have its own reduction ratio RR. The reduction ratios supported by a specific IO device are also appropriately listed in a configuration file. In particular, reduction ratios between 1 and 16,384 are possible.

As a result of the reduction ratio, there are multiple send clocks that can be used for sending in each cycle. For a reduction ratio of 8, for example, applying the reduction ratio "every eighth send clock" of a cycle, eight possible clocks can be used as a start point. These are usually designated and numbered as phases. In other words, each send clock time or each send clock timespan represents a phase. In the example of a reduction ratio of 8, there are eight phases in total per send cycle. Numbered consecutively, this results in corresponding phase 1, phase 2, . . . , phase 8.

The time duration of a send clock/phase can be calculated from the send clock factor. The value can usually lie between 1 and 128 and defines the timespan for a send clock and therefore a phase in the time plan. The send clock factor is the number of steps lasting usually 31.25 microseconds (basic unit of time for the PROFINET time plan, in particular) that form a phase or a send clock. Accordingly, it applies that $PH=SCF \times 31.25$ microseconds or $SC=SCF \times 31.25$ microseconds, where PH is the phase, SC the send clock and SCF the send clock factor. The send clock factors supported by a specific IO device are appropriately listed in a configuration file. The PROFINET specification generally requires that all devices support a send clock factor of 32, corresponding to a send clock or send clock time of 1 millisecond ($32 \times 31.25$ microseconds=1 millisecond). All other send clock factors are optional.

The length of the update cycle or send cycle used between the respective controller and IO device can be obtained by calculating the product of the reduction ratio RR, the send clock factor SCF and the basic unit of time of 31.25 microseconds, and therefore $SZ=RR \times SCF \times 31.25$ microseconds. The maximum send or update cycle/the maximum update time within which each sending communication partner has sent at least once can be obtained by applying the maximum reduction ratio RRmax. In the example of a maximum reduction ratio of 8 and a send clock factor of 32, the result would be a (maximum) send cycle of 8 ms in which all senders have sent at least once.

A corresponding cyclical data communication in an automation system is described in the book "Automating with PROFINET-Industrial Communication based on Industrial Ethernet" by Raimond Pigan, Second Edition, 2008, ISBN 978-3-89578-294-7. Such a data communication method is also disclosed in EP 2 759 896 A1, likewise filed by the applicant.

The send clock and the reduction ratio together with the timely feed-in of the packets by the devices are effectively the core of the PROFINET scheduling model.

In the EEE, extensions by the Time Sensitive Networking (TSN) task group allow periodic or cyclical transfers (so-called streams) to be particularly well protected in the network. The TSN task group is a successor to the Audio/Video Bridging (AVB) task group. TSN includes many standards, Time Synchronization (Institute of Electrical and Electronics Engineers (IEEE) 802.1 AS-REV), Frame Preemption (IEEE 802.1 Q-2018) and Reservation (IEEE 802.1 Q-2018, IEEE 802.1 Qcc) being cited purely as examples in this context. Also known is the Stream Reservation Protocol (SRP) (see IEEE 802.1 Q-2018), via which transfer resources can be dynamically reserved and latency times can be guaranteed. With automatic SRP configuration, it is possible in particular to guarantee a protected transfer within a specific maximum latency for streams with a successful reservation.

In the context of AVB and TSN, a sender is also referred to as a talker and a receiver as a listener.

The use of standardized AVB and TSN mechanisms requires an adaptation of the systems. If PROFINET is extended to include TSN in particular, the question arises of mapping the previous network usage model.

While timely feed-in and send clock are included in the IEEE 802.1 Q model, this does not apply to the reduction ratio. Therefore, the existing applications/use cases cannot be mapped onto TSN, even at higher link speeds, e.g., by upgrading from the 100 Mbit/s that is usual today to 1 Gbit/s or higher.

Also known from the prior art is the "Intermediate System to Intermediate System Protocol" (IS-IS protocol) as per International Organization for Standardization/International Electrotechnical Commission (ISO/IEC) 10589:2002. This relates to the routing or Interior Gateway Protocol (IGP) via which routing information can be exchanged between "Intermediate Stations (IS)" that may be present in the form of network nodes (e.g., bridges) or gateways, for example. In this way, provision is made in particular for intermediate stations to send out information at least about their immediate neighbors in each case, and for each station to receive "knowledge of the topology" based on the messages received from other stations and the information about their neighbors. For example, a database or list can be constructed containing topology information, in particular path information. Using the IS-IS protocol, it is therefore possible to record the topology of a given network in a decentralized manner.

The topology can then serve as a basis for the development of trees ('tree' is an IEEE term in logical or active topology) by further algorithms such as Dijkstra or GADAG (A Genetic Algorithm for Learning Directed Acyclic Graphs).

A path can be established on the basis of the trees, e.g., using "MRP Based Stream Reservation" (MRP: Multiple Registration Protocol, see IEEE protocol), in particular with extensions in the case of MRP, or later "LRP" methods (LRP: Link-local Registration Protocol, see IEEE protocol). A reservation protocol such as Resource Allocation Protocol (RAP) can also be linked to the trees via extensions.

SUMMARY OF THE INVENTION

It is an object of the present invention to provide a technical implementation and a method via which more (in particular previously existing) industrial use cases/applications can also be realized in networks that employ AVB/TSN.

This and other objects and advantages are achieved in accordance with the invention by a method for data communication in a network having a plurality of network nodes, where data packets are to be transferred between communication partners over protected connections. In particular, the network can be a network of an industrial automation system. The data packets originate from at least two different sending communication partners, subsequently referred to as senders. The sending frequencies of at least two senders, with which the senders send data packets that are to be transferred over a protected connection, each differ from one another. The sending frequencies or variables representing these are taken into account when determining a path for the transfer of the data packets of at least one protected connection. Furthermore, the sending frequencies or variables representing these are specified as reduction ratios that are taken into account when finding a path.

In a manner which is known, a path is appropriately sought along which the participating network nodes or their ports in a sending direction satisfy requirements associated with the protected connection to be established, e.g., a particular maximum latency or sufficient bandwidth.

As a result of inventively taking into account the sending frequency, possibly via a variable representing this, when finding a path, it is possible to work with significantly more available paths and hence significantly more protected connections, e.g., TSN streams in a network, and the efficiency is significantly increased as a consequence. This means that many more existing requirements and applications can be mapped onto AVB and/or TSN.

One example of a protected connection is a stream, as defined by the Audio/Video Bridging (AVB) task group and in particular by the Time-Sensitive Networking (TSN) task group in the international standard IEEE 802.1. For a protected connection, resources are appropriately reserved at the participating network nodes in a manner that is known from the prior art. A protected connection is characterized in particular by a specific identifier assigned to it, in particular a stream identifier that is preferably in the form of a stream ID.

It may be that only one path is to be found for a protected connection. It should be understood it is also possible to search for more than one path, e.g., in order to allow a particularly fail-safe redundant communication over two redundant paths, for example.

The sending frequencies or variables representing these of already established and in particular already used protected connections are appropriately taken into account when finding at least one path for at least one further protected and in particular yet to be established connection. This taking into account can occur in the context of establishing the at least one further protected connection.

The time for the data communication is preferably broken down into consecutive cyclical time slots of identical duration, namely send clocks.

As disclosed in the prior art, a reduction ratio is expressed in each case as a whole number in particular, which specifies the number of send clocks from one sent packet to the next. A reduction ratio of 2, 3, 4 or 8, for example, means that data packets are not sent in each of the consecutive send clocks but only in every second, third, fourth or eighth send clock. A reduction ratio of 1 signifies that a packet is sent in each send clock.

The send clocks are preferably numbered consecutively, where the numbering begins at one and rises incrementally to a maximum number, where this maximum number corresponds in particular to the maximum reduction ratio, and in particular in a next cycle starts at one again in each case for the send clock following the send clock having the highest number from the preceding cycle in particular.

The consecutive numbering in each cycle appropriately begins at one, increases in each case to the maximum reduction ratio in particular, and then begins at one again in the following cycle, and so on. For a reduction ratio of four, for example, send clock 1, send clock 2, send clock 3 and send clock 4 would occur in a cycle, followed then by send clock 1, etc. of the next cycle. If the counted or consecutively numbered send clocks are referred to as phases, this would correspondingly result in phase 1, phase 2, phase 3, phase 4, phase 1, etc.

Furthermore, when finding a path, provision is preferably made for taking into account those send clocks, in particular those phases, in which the data packets are cyclically sent. If the send clocks/phases are numbered, provision is preferably made for taking into account the number of that send clock (phase) in which the data packets are sent cyclically (in each cycle). For a given reduction ratio, e.g., a reduction ratio of 4, it can additionally be taken into account that data packets are sent in send clock 3 (phase 3). This means that packets are not sent in every send clock, but only every four send clocks, where packets are each sent in the third send clock/third phase (send clock 3/phase 3) of a cycle. It is already known from the prior art, in particular in connection with PROFINET, that a transfer can be characterized by a reduction ratio and a start-send-clock or a start-phase-number, and that this proves satisfactory. It should be noted that for the maximum possible sending frequency, which corresponds to packets being sent in every send clock (corresponding to the minimum reduction ratio of 1), it is not necessary or possible to specify a start-send-clock or start-phase. Therefore, the send clocks, in particular the phase, in which the data packets of the respective protected connection are cyclically sent are appropriately only specified for those senders who send with a reduction ratio greater than 1, i.e., not in every send clock.

The taking into account of the sending frequencies or the variables representing these preferably includes determining the resulting load on the ports of participating network nodes and taking this into account when finding a path.

In a further particularly preferred embodiment, the load on ports of at least those network nodes participating in protected connections, in the different send clocks (in particular phases), is taken into account when finding a path. In this way, it is particularly possible to ignore routes or paths that are no longer available for a specific reduction ratio or phase. For at least one protected connection, a path is preferably determined taking into account the load on the ports in the different consecutive send clocks, in particular phases. The ports in a sending direction are appropriately considered or taken into account. The load on the ports is alternatively known as the occupancy of the ports.

The load/occupancy resulting from existing established protected connections is appropriately also considered or determined and taken into account.

In a send clock/phase, a specific portion is usually available for protected connections, in particular streams. For example, 20% of each send clock/phase may be available for protected connections. In the case of a send clock with a length of 1 millisecond, e.g., the first 200 microseconds in particular. At 1 Gbit/s, this would correspond to approximately 25 Kbytes of data. The load of a send clock/phase is understood to mean how much of the portion provided/available for protected connections is occupied or in use. In the cited example therefore, how much of the 200 microseconds is already occupied by protected connections.

In order that the load/occupancy in the different send clocks (in particular phases) can be taken into account, the corresponding information is appropriately provided, e.g., by the actual network nodes involved. The information can be transmitted to a central point at which provision is made for calculating or finding a path. If the paths are processed centrally, then this information is available at all times. If a method such as IS-IS is used, then the information is distributed to all nodes via the functionality defined therein. In principle, it is then again available in every node.

In a further advantageous embodiment, a database is maintained in which information is stored about the load on the ports in a sending direction of at least those network nodes participating in protected connections, in the different send clocks (in particular phases). A corresponding database can be maintained by, e.g., at least those network nodes participating in protected connections established in the network, preferably all network nodes of the network. In practical terms, this represents a decentralized/distributed model or decentralized/distributed solution. Alternatively or additionally, such a database can be maintained at a central point, which then corresponds to a centralized model or centralized solution. Both embodiments have proved to be suitable, the decentralized/distributed solution having the advantage that a central point, in particular associated hardware, is not required.

The maintained database can be an IS-IS database in which information is additionally stored about the load on the ports in a sending direction of at least those network nodes participating in protected connections, in the different send clocks (in particular phases).

It may be that at least those network nodes participating in protected connections publish, preferably repeatedly, the load on at least one of their ports in a sending direction in the different send clocks (in particular phases), in particular to one or more other network nodes, i.e., by sending messages with corresponding content.

Messages containing the information about the load on the ports in the different send clocks/phases can be exchanged e.g., in the context of a protocol, in particular in the context of the IS-IS protocol, this having proved particularly suitable.

The IS-IS protocol is in particular the "Intermediate System to Intermediate System Protocol", preferably as per ISO/IEC 10589:2002(E). This is a particularly suitable protocol for creating and receiving topology information in particular.

Further protocols, e.g., routing protocols, can also be used. Purely by way of example, reference is made to Open Shortest Path First (OSPF) as a further protocol that can likewise be used in the context of the present invention (for further information about OSPF, see the Request for Comments RFC 2328, for example).

In a particularly advantageous embodiment, a tree is calculated for each of the different send clocks, in particular phases. Furthermore, the trees preferably do not contain any paths for which it applies that at least one port of at least one participating network node in a sending direction is loaded to a predetermined degree or completely in the send clocks (in particular phases) belonging to the tree. For example, a dedicated tree can be calculated in each case for send clock 1/phase 1, send clock 2/phase 2, send clock 3/phase 3, etc., where the tree appropriately does not contain any paths in which, due to excessive load in the respective send clock/phase, no further (protected) data transfer is possible in this send clock/phase.

The associated tree is preferably updated each time a port can no longer be used for a phase as a result of the load. This means that updated trees are always available.

If the send clock occupancy or phase occupancy is taken into account, in particular recorded in a database (e.g., an IS-IS database) or exchanged with all participating network nodes, then it is possible using suitable algorithms, e.g., Dijkstra or GADAG, to generate a dedicated tree for each reduction ratio, even for each phase, and to search for and check a path on the basis of the tree.

If the information is provided and taken into account, a path algorithm can then use the associated tree as soon as a path is required for a specific reduction ratio.

If the sending frequencies are taken into account, if in particular, e.g., the IS-IS database is extended to include the information about the load on the ports of the nodes in the different send clocks/phases, then it also becomes possible to dispense with a further protocol for establishing the paths. In particular, a further protocol such as MRP or LRP/RAP is no longer required in order to establish a path. It is sufficient for a node to enter/register the path locally. After this, e.g., the IS-IS protocol ensures that it is contained and can therefore be used in all databases or in all parts/versions of a database that is distributed over a plurality of nodes.

Following the (respective) path, the latency can be added up in each node. If all of the information is integrated in an IS-IS database, for example, each node can perform the complete check.

A time reference (working clock) that starts at 0 can be used here. If the current value of the time reference/working clock is divided by the send clock, the start time point of the send clock is obtained when the remainder=0. If it is divided by the reduction ratio, the start of phase 1 is obtained when the remainder=0. "Working clock" mod "send clock" gives the offset within the phase. "Working clock" div "send clock" gives the number of phases that have elapsed since "0". Remainder: the number remaining after a division. If this number remaining is "0", the working clock shows precisely the start of the phase, i.e., the offset within the phase is "0". All senders appropriately have the same understanding of the phase assignment/phase numbering. Consequently, such a method can be applied in order to ensure this.

The disclosed embodiments of the present invention are implemented in particular by a network node which is configured to perform the method in accordance with disclosed embodiments of the invention. A network node, which can also be referred to as a network element, can take the form of a bridge or a switch. In a preferred embodiment, the network node has two or more ports. In a preferred embodiment, the network node is configured to publish, at least for those of its ports via which data packets of established protected connections are to be forwarded, information about the load resulting from established protected connections in different send clocks or phases.

The network is Ethernet-compatible for the purposes of this invention, being in particular an Ethernet-based network. In particular, in order that protected connections such as streams are supported with a guaranteed quality of service (QoS), the network is or in particular at least the participating network nodes are preferably compatible with AVB or TSN, and supports or support in particular the establishment of protected connections with reserved network resources at the participating network nodes. This preferably applies correspondingly to the inventive network node.

AVB and TSN are sufficiently well known from the prior art. For the purpose of setting up or establishing protected connections, in particular streams, use is preferably made of a reservation protocol, e.g., SRP or MSRP as per IEEE 802.1 Q in particular. The inventive network node is preferably configured accordingly.

It is also an object of the present to provide a computer program that can be loaded into a working memory of a computer and that has at least one section of program code, the execution of which causes a method to be performed in accordance with the disclosed embodiments of the invention. The computer program is preferably stored on a computer-readable medium. The computer-readable medium can be, e.g., a CD-ROM or DVD or a USB or flash memory. A computer-readable medium is not understood to mean a physical medium exclusively. Rather, a computer-readable medium can take the form of a data stream or a signal which represents a data stream.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and advantages of the present invention are illustrated by means of the following description of inventive embodiment variants and with reference to the appended drawing, in which.

DETAILED DESCRIPTION OF THE EXEMPLARY EMBODIMENTS

Figure 1:
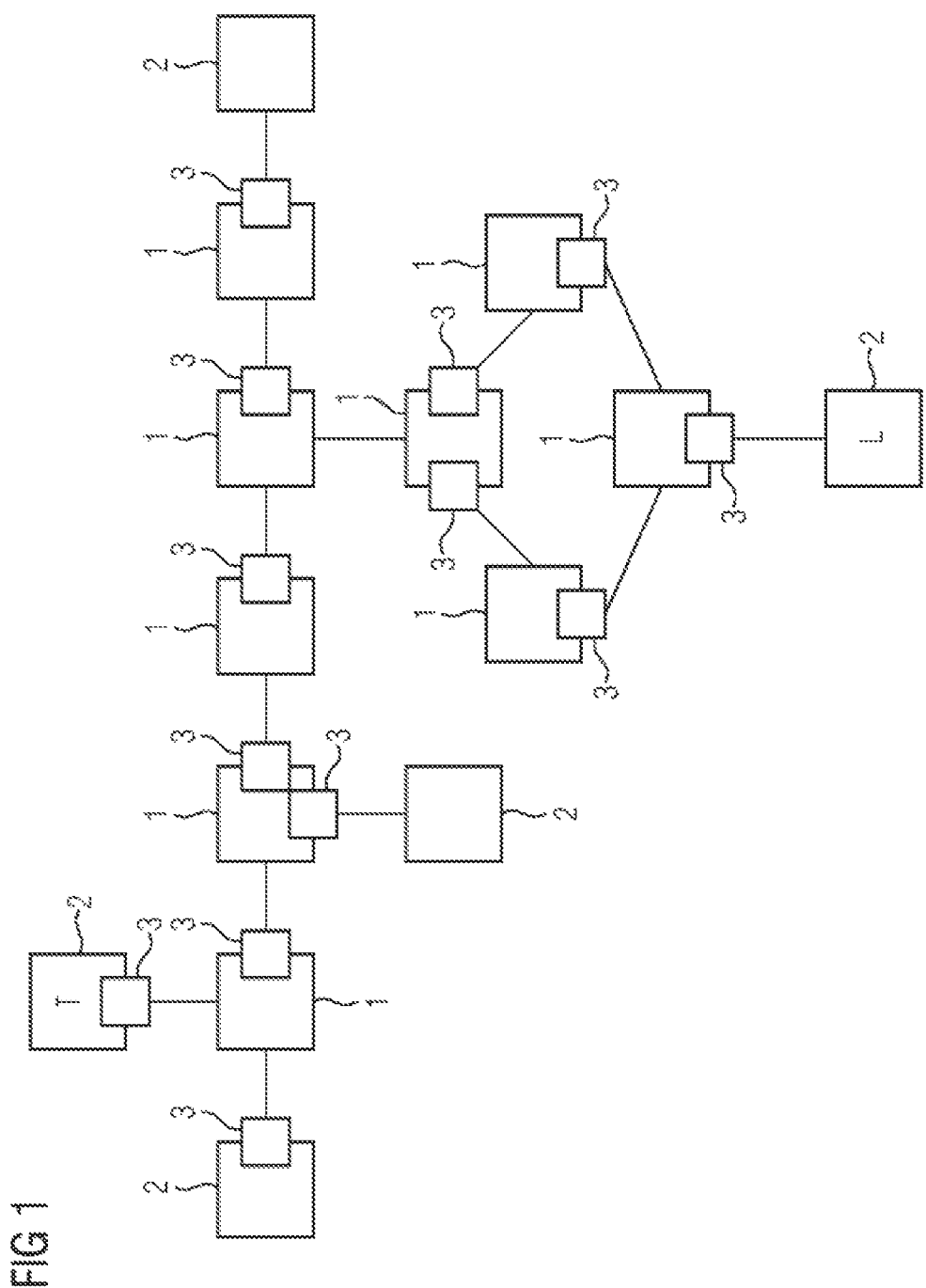
FIG. 1 shows a diagram illustrating a send cycle, send clocks and reduction ratio in accordance with the invention.

FIG. 1 shows a purely schematic partial illustration of an industrial Ethernet-based network having a plurality of network nodes 1 that exist in the form of bridges in the illustrated exemplary embodiment. In addition to a total of nine network nodes 1, it is possible to identify five communication partners in the form of terminals 2, of which one communication partner T wants to cyclically send data packets (also referred to as data frames) to a further communication partner L. The communication partner T therefore represents a sender and is also referred to here as a talker. The communication partner L, which is intended to be the recipient of the sent data, is referred to below as a listener. Ports 3 of the network nodes and the communication partners 2 are likewise illustrated schematically in FIG. 1.

It should be noted that the network, which is only partially illustrated, comprises or may comprise a multiplicity of further network nodes 1, and that further communication partners 2 participate or may participate in the network.

In the case of the exemplary described embodiment, the talker T wants to periodically send data frames in real time with a guaranteed quality of service, in particular a guaranteed maximum latency, to the listener L in the context of or for a control application for an industrial technical process that is not shown in further detail. Accordingly, a TSN stream has to be established between the talker T and listener L.

For the purpose of the protected transfer, network resources, such as bandwidth or filter database entries or queue storage, must be reserved at the participating network nodes 1 where available. The establishment of streams and associated reservations, e.g., using a reservation protocol, is well known from the prior art and is not explained in greater detail here. Purely by way of example, reference is made to the standards IEE802.1Q, IEE802.1AS, IEE802.1BA and IEE802.1CB in this regard.

Figure 2:
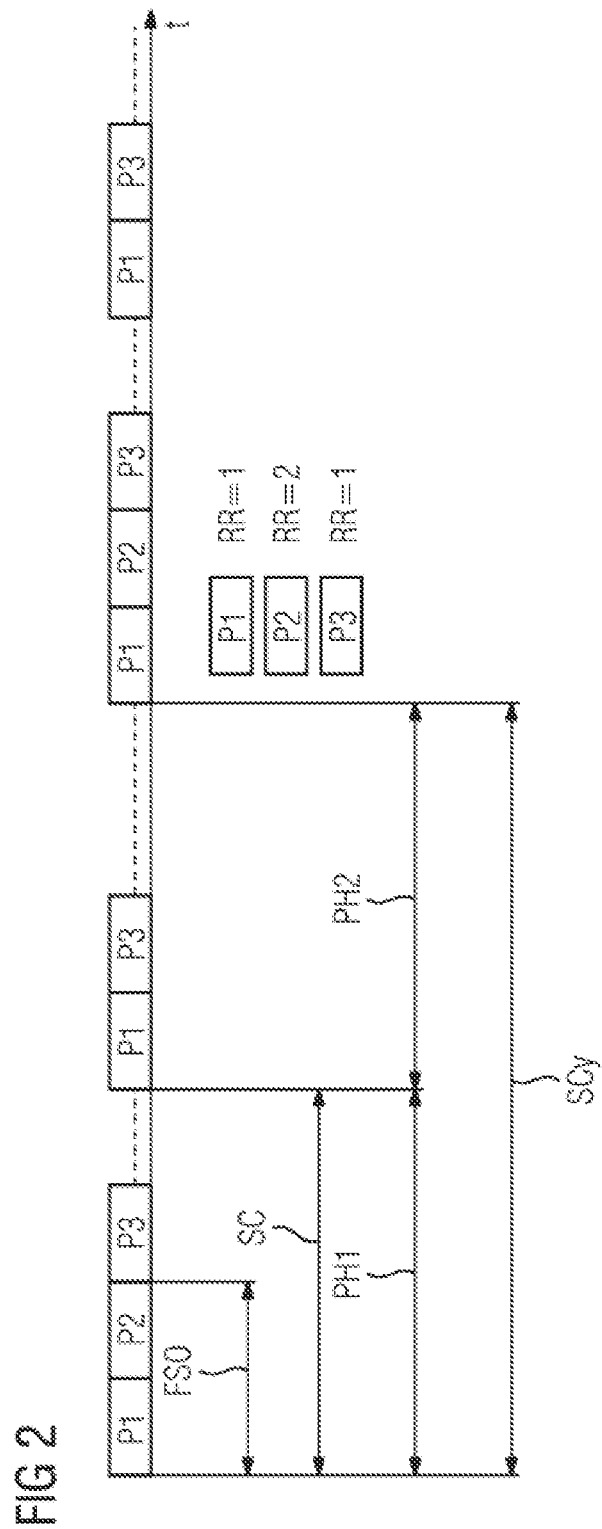
FIG. 2 shows a diagram for the cyclical transfer of data packets in accordance with the invention.

FIG. 2 shows a purely schematic illustration for the cyclical transfer of data packets (also referred to as data frames) in accordance with PROFINET IO, for example. Specifically, the time for the data communication is broken down into consecutive cyclical time slots of identical duration, "send clocks" SC, such that the natural continuous time is discretized. The send clock or the send clock time is usually defined in the context of the configuration, in particular by the user.

In particular, in the event that packets of different senders are not generated at the same rate, a reduction ratio can be configured. The reduction ratio specifies how often the cyclical IO messages are exchanged. In particular, the whole-number multiple of the send clock SC is used by the (respective) sender for the purpose of sending packets. A reduction ratio RR of 1 means that IO messages are sent in each send clock. A reduction ratio of 8 means, for example, that sending only occurs once in every 8 send clocks.

In order to illustrate different reduction ratios RR, purely by way of example, data packets P1, P2, P3 that originate from three different senders and that are to be transferred or are transferred in each case over a protected connection, specifically as a TSN stream, are illustrated in FIG. 2.

For example, the packets P1 can be sent from the talker T illustrated in FIG. 1. The packets P2 and P3 with a reduction ratio can originate, e.g., from other terminals 2 in FIG. 1 and can be transferred to other terminals 2. It is of course also possible for the packets P2, P3 to originate from or be destined for further and different devices not identifiable in FIG. 1.

The packets P1 and P3 are sent cyclically with a reduction ratio of 1 and the packets P2 with a reduction ratio of 2. It can be seen that the packets P1 and P3 are sent in each send clock SC, but the packets P2 are only sent in every second send clock SC.

The sending frequencies, i.e., the frequencies with which the data packets P1, P2, P3 are sent, differ in other words. Specifically, the packets P1 and P3 are sent with twice the frequency of the packets P2. The reduction ratios of 1 and 2 are variables that represent the sending frequencies.

Each configured terminal 2, e.g., an IO device, can have a dedicated reduction ratio RR. The reduction ratios supported by a specific IO device are appropriately listed in a configuration file likewise. For example, reduction ratios between 1 and 16,384 are possible.

As a result of the reduction ratio, there are multiple send clocks SC that can be used for sending in each cycle SCy (a cycle in which all senders have generated and sent data once). For a reduction ratio of 2, for example, applying the reduction ratio "every second send clock" of a cycle, two possible clocks SC can be used as a start point. These are usually designated and numbered as phases PH1, PH2. In other words, each send clock time or each send clock timespan represents a phase. In the example with a reduction ratio of 2, there are two phases PH1, PH2 in total per send cycle SCy. Numbered consecutively, this results in corresponding phase 1 and phase 2 as illustrated in FIG. 2. The start phase of the packets P2 with the reduction ratio 2 is the phase 1, i.e., PH1, as shown in FIG. 2. Alternatively, the start phase could also be the phase PH2, in which case all three packets would be send in this phase.

The time duration of a send clock/phase can be calculated from the send clock factor. The value can usually lie between 1 and 128 and defines the timespan for a send clock and therefore a phase in the time plan. The send clock factor is the number of steps lasting usually 31.25 microseconds (basic unit of time for the PROFINET time plan in particular) that form a phase or a send clock. Accordingly, it applies that PH=SCF×31.25 microseconds or SC=SCF×31.25 microseconds, where PH is the phase, SC the send clock and SCF the send clock factor. The send clock factors supported by a specific IO device are appropriately listed in a configuration file. The PROFINET specification generally requires that all devices support a send clock factor of 32, corresponding to a send clock or send clock time of 1 millisecond (32×31.25 microseconds=1 millisecond). All other send clock factors are optional. In the case of the example described here, the duration of a send clock SC is 1 ms, and therefore the send clock factor is 32.

The length of the send cycle can be obtained by calculating the product of the maximum reduction ratio RRmax, the send clock factor SCF and the basic unit of time of 31.25 microseconds, and therefore SZ=RRmax×SCF×31.25 microseconds. In the example of a reduction ratio of 2 and a send clock factor of 32, the result is a send cycle of 2 ms.

Also marked in FIG. 2, e.g., for the packet P3 in the first phase PH1, is the so-called frame send offset FSO. This corresponds to the offset of the packet P3 relative to the start time point of that send clock SC in which the packet P3 is transferred. The frame send offset FSO is normally specified as a number of 250-ns steps. A frame send offset FSO can optionally be preconfigured for further optimization.

Figure 3:
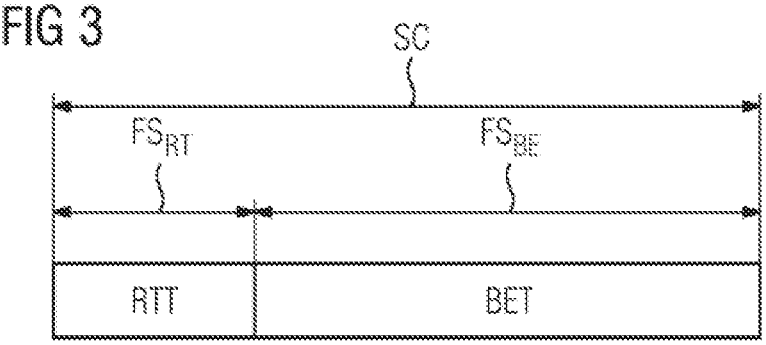
FIG. 3 shows the real-time and best-effort regions of a send clock with associated fill-levels in accordance with the invention.

It should be noted that the real-time data packets P1, P2, P3 of the protected connections, or that portion of each send clock designated for these, are each followed by packets of the best-effort traffic as disclosed in the prior art. This is indicated in a purely schematic manner in FIG. 3, which very simply shows the real-time traffic RTT and best-effort traffic BET in the form of bars and, via arrows above these in each case, the fill-level $FS_{RT}$ of the real-time traffic RTT, the fill-level FSBE of the best-effort traffic BET, and the send clock SC. The arrows here are selected such that the two regions of the send clock are "full".

The send clock and the reduction ratio, together with the timely feed-in of the packets by the devices, effectively form the core of the PROFINET scheduling model. While timely feed-in and send clock are included in the IEEE 802.1 Q model, this does not apply to the reduction ratio. Therefore, the existing applications/use cases cannot be mapped onto TSN, even at higher link speeds, e.g., by upgrading from the 100 Mbit/s that is usual today to 1 Gbit/s or higher.

In order to address this problem, the present invention provides for the sending frequencies or variables representing these to be taken into account when finding a path for the transfer of the data packets of at least one protected connection. These are preferably taken into account when finding a path for all protected connections.

In this case, the reduction ratios that are used for the purpose of sending the data packets P1, P2, P3 are taken into account as the variables representing the sending frequencies when finding a path. If the reduction ratio is not 1, provision is made for additionally taking into account the respective send clock or phase in which the sending occurs. Only the reduction ratio of the packets P2 is not equal to 1 in this case, meaning that only for these packets is it additionally taken into account that the sending occurs in the phase 2 in each cycle. In other words, the number of the send clocks/phases in which packets are sent is taken into account.

Specifically, the load on the ports 3 in a sending direction of at least those network nodes 2 participating in protected connections, in the different send clocks SC (in particular phases PH1, PH2), is taken into account when finding a path.

Figure 4:
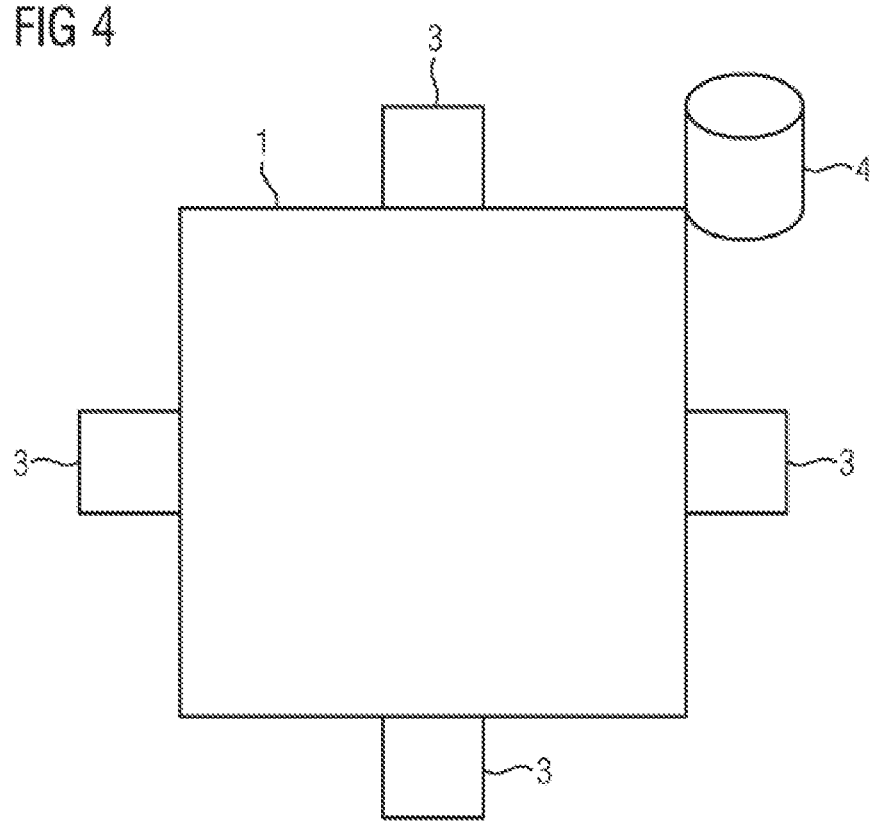
FIG. 4 shows a node with four ports and a database in accordance with the invention.

To this end, a database is maintained in which information is stored about the load on the ports 3 in a sending direction of at least those network nodes 2 participating in protected connections, in the different send clocks SC (in particular phases PH1, PH2). Specifically, each network node has a data store 4 in which the current load on the ports 3 is stored. This is illustrated in a schematic and exemplary manner for a network node 1 in FIG. 4.

At least those network nodes 1 participating in protected connections repeatedly publish the current load on their ports 3 in a sending direction, in the different send clocks SC (in particular phases PH1, PH2), in particular to all other network nodes 1. In the exemplary presently described embodiment, the publishing occurs by sending messages with corresponding content. Here, the information relating to the phase-dependent current port load is exchanged by the network nodes 1 in the context a suitable protocol, e.g., a routing protocol, specifically the IS-IS protocol.

As an alternative or in addition to such a distributed/decentralized model, a database can also be maintained at a central point, which then corresponds to a centralized model or centralized solution.

The information relating to the phase-dependent port load can also be part of an existing IS-IS database.

A tree is calculated for each of the different send clocks SC, in particular phases PH1, PH2. Here, the trees do not include any paths for the case that at least one port 3 of at least one participating network node 1 in a sending direction is loaded to a predetermined degree or completely in the send clocks SC (in particular phases PH1, PH2) belonging to the tree.

Figure 5:
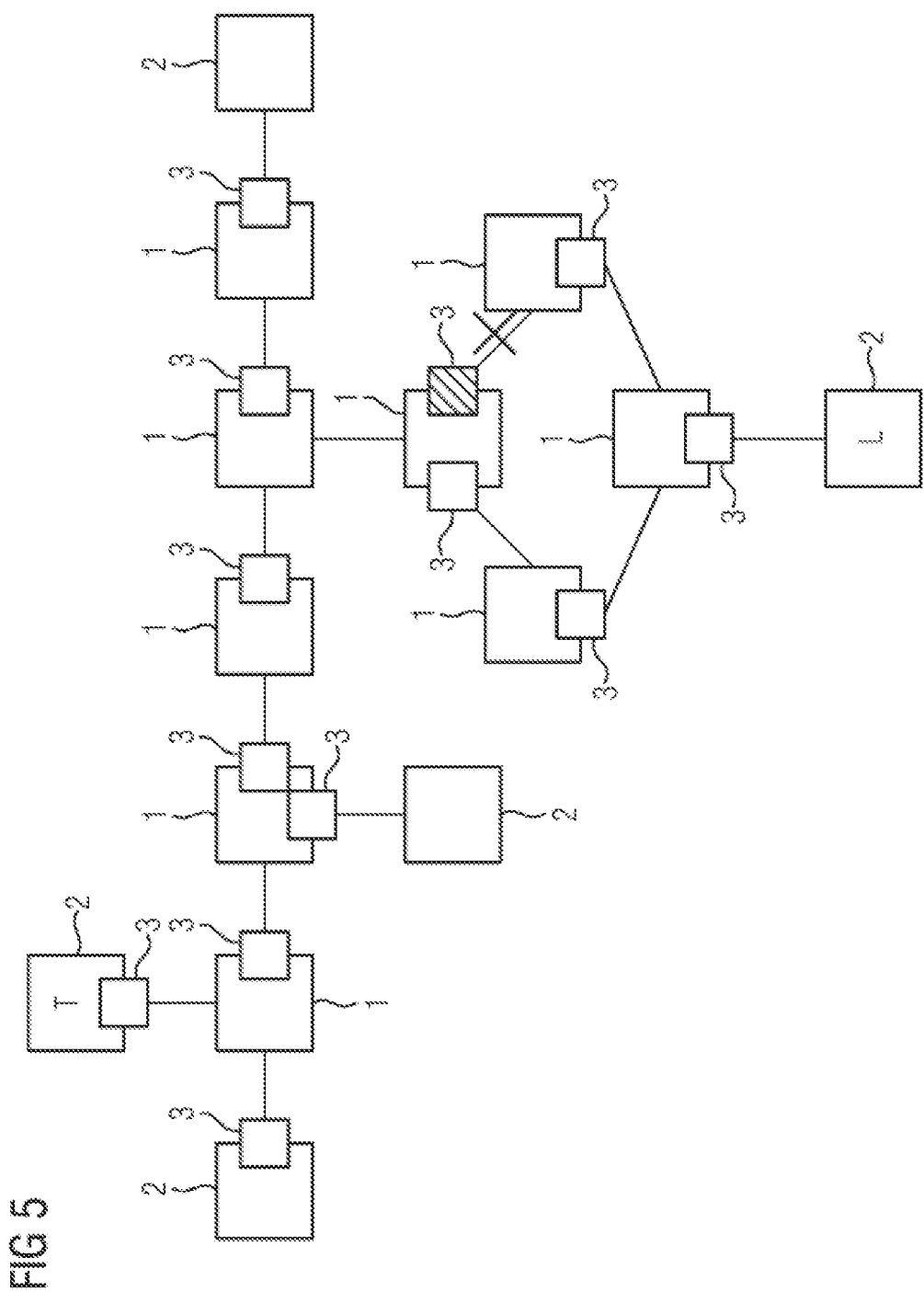
FIG. 5 shows the network from FIG. 1, in which the port of a node is full in a phase.

This is illustrated again in a purely schematic and exemplary manner for a resulting tree in FIG. 5. This shows the network as per FIG. 1, where it applies that the port 3 in a sending direction of one of the nodes 1 is completely loaded, i.e., effectively "full", in phase 1 with a reduction ratio 2. The corresponding port 3 is hatched in FIG. 5 and the connection to the adjacent node 1 is crossed through in order to show that the path or route via this port 3 and the connection is no longer possible.

If a port 3 is loaded to the extent that it cannot accommodate a further protected connection, in particular a further stream, it is no longer part of the tree. The load is generated by all protected connections (in particular streams) of all reduction ratios that are sent in a send clock SC. As a result of updating the trees, it can occur that no more trees are available for this (or for a specific) reduction ratio. Here, in particular, a "pathfinder" will not find any more paths and it will not be possible to establish any more protected connections, in particular streams.

A tree that has been "pruned" of this path is then stored for this reduction ratio and phase. In other words, "corrected" or "pruned" trees are calculated and used for individual send clocks SC or phases PH1, PH2.

The associated tree is preferably updated each time a port can no longer be used for a phase due to the load. Updated trees are then available at all times.

The addition of each further protected connection/stream can result in a port becoming fully loaded in a phase. This means that each further protected connection can update the trees.

In the event that there is a port (or a plurality of ports) via which no further protected connections can be established, there may be listeners/talkers between whom no more paths can be established.

If the send clock occupancy or phase occupancy is taken into account, in particular recorded in an IS-IS database or exchanged with all participating network nodes, it is possible using suitable algorithms, e.g., Dijkstra or GADAG, to generate a dedicated tree for each reduction ratio, even for each phase, and to search for and check a path on the basis of the tree. As soon as a path is required for a specific reduction ratio, a path algorithm can then use the associated tree.

As a result of inventively taking into account the sending frequencies or variables representing these, and the resulting send clock occupancy or phase occupancy, when finding a path, it is possible to work with significantly more available paths and hence significantly more protected connections, e.g., TSN streams in a network, and the efficiency is significantly increased as a consequence. This means that many more existing requirements and applications can be mapped onto AVB and/or TSN.

It should be noted that the network nodes 1 all represent exemplary embodiments of network nodes in accordance with the the invention, and are configured to perform the exemplary embodiments described here of the described method in accordance with the disclosed embodiments of the invention.

Figure 6:
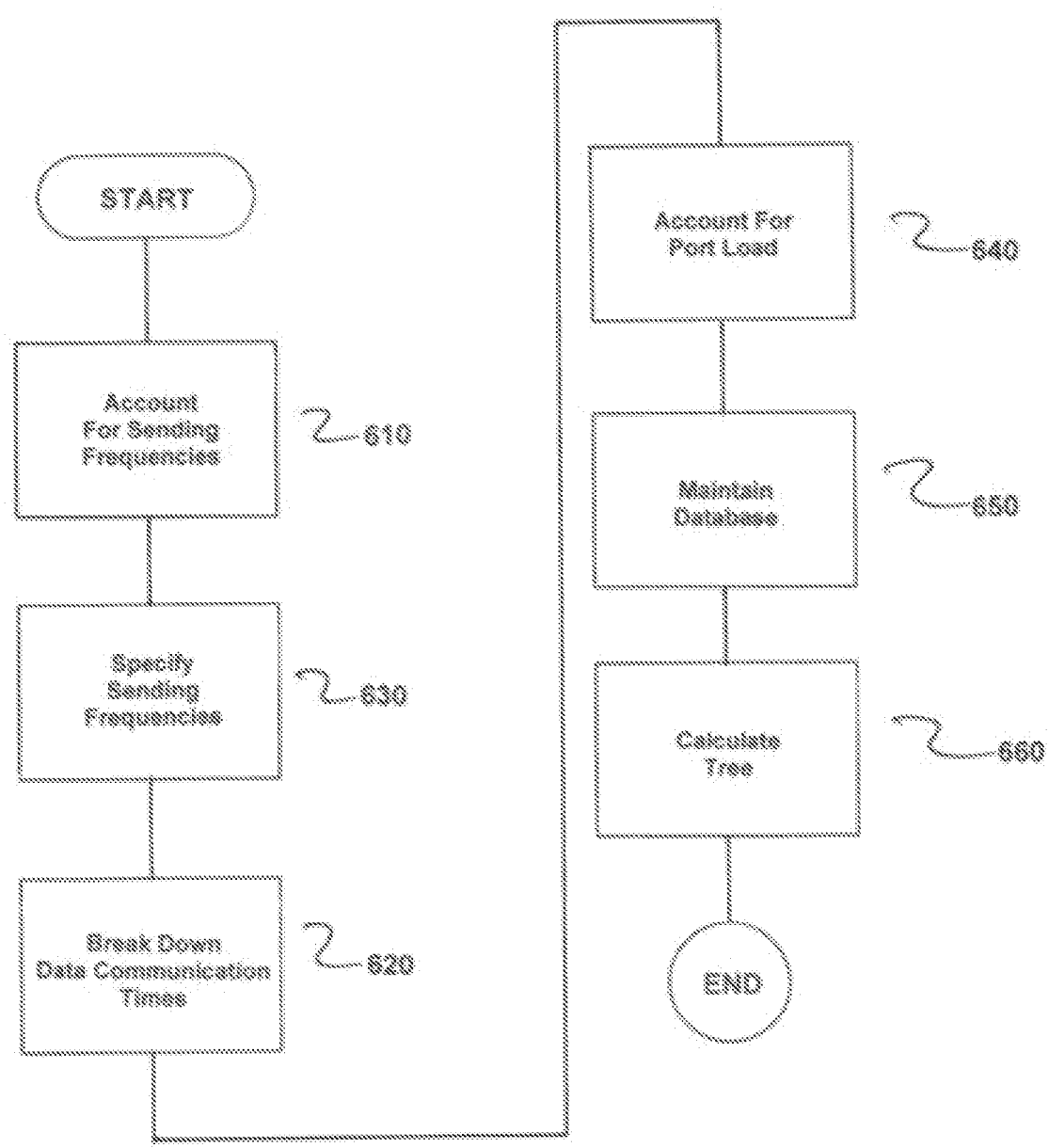
FIG. 6 is a flowchart of the method in accordance with the invention.

FIG. 6 is a flowchart of the method for data communication in a network having a plurality of network nodes 1 which are arranged between the communication partners 2, where data packets P1, P2, P3 are transferred cyclically with sending frequencies between the communication partners 2 over protected connections, the data packets P1, P2, P3 originate from at least two different sending communication partners 2, and the sending frequencies of the at least two communication partners 2, with which the at least two communication partners 2 send data packets P1, P2, P3, differ from one another. The method comprises taking into account the sending frequencies when finding a path for transfer of the data packets P1, P2, P3 of at least one protected connection, as indicated in step 610.

Next, the sending frequencies are specified as reduction ratios RR that are taken into account when finding the path, as indicated in step 620. Here, the reduction ratio specifies how often the data packets P1, P2, P3 are sent cyclically.

Next, the time for data communications is broken down into consecutive send clocks SC and those send clocks SC in which the data packets P1, P2, P3 are cyclically sent are taken into account when finding the path, as indicated in step 630.

Next, a load on ports 3 of at least those network nodes 1 participating in protected connections, in the different send clocks SC, is taken into account when finding the path, as indicated in step 640.

Next, a database 4 in which information is and/or will be stored about the load on the ports 3 in a sending direction of at least those network nodes 1 participating in the protected connections, in the different send clocks SC, is maintained, as indicated in step 650.

Next, a tree is and/or will be calculated for each of the different send clocks SC, as indicated in step 660. In accordance with the invention, trees do not contain any paths for which at least one port 3 of at least one participating network node 1 in a sending direction is loaded to a predetermined degree or completely in the send clocks SC belonging to the tree.

Although the invention is illustrated and described in detail by means of the preferred exemplary embodiment, the invention is not restricted by the examples disclosed and other variations can be derived therefrom by a person skilled in the art without departing from the scope of the invention.

Even though a greatly simplified situation is shown in FIG. 2, for example, with packets from only three senders and reduction ratios of only 1 and 2, it is understood that packets from significantly more senders may require to be transferred over protected connections, in particular as TSN streams, and that significantly higher reduction ratios than 1 and 2 may alternatively or additionally be present.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for data communication in a network having a plurality of network nodes which are arranged between communication partners, data packets being transferred cyclically with sending frequencies between the communication partners over protected connections, the data packets originating from at least two different sending communication partners, and the sending frequencies of the at least two communication partners, with which the at least two communication partners send the data packets, differing from one another, the method comprising:

taking into account the sending frequencies in response to finding a path for transfer of the data packets of at least one protected connection;

specifying the sending frequencies as reduction ratios which are taken into account in response to finding the path, the reduction ratio specifying how often the data packets are sent cyclically;

breaking down a time for data communications into consecutive send clocks and take into account those consecutive send clocks, in which the data packets are cyclically sent, in response to finding the path;

taking into account a load on ports of at least those network nodes participating in protected connections, in different send clocks, in response to finding the path;

maintaining a database in which information is and/or will be stored about the load on the ports in a sending direction of said at least those network nodes participating in the protected connections, in the different send clocks; and calculating a tree for each different send clock;

wherein trees do not contain any paths for which at least one port of at least one participating network node in a sending direction is loaded to a predetermined degree or completely in the send clocks belonging to the tree.

2. The method as claimed in claim 1, wherein the send clocks are numbered consecutively; wherein said numbering begins at one and rises incrementally to a maximum number which corresponds to the maximum reduction ratio, and in a next cycle starts at one again in each case for a consecutively numbered send clock following a consecutively numbered send clock having the highest number from the preceding cycle, wherein a cycle comprises a number of consecutively numbered send clocks which result due to the reduction ratio.

3. The method as claimed in claim 1, wherein said at least those network nodes participating in protected connections publish the load on at least one of their ports in a sending direction, in the different send clocks, to at least one other network node by sending messages with corresponding content.

4. The method as claimed in claim 2, wherein said at least those network nodes participating in protected connections publish the load on at least one of their ports in a sending direction, in the different send clocks, to at least one other network node by sending messages with corresponding content.

5. The method as claimed in claim 3, wherein messages containing the information about the load on ports in the different send clocks are exchanged in accordance with the Intermediate System-Intermediate System protocol.

6. A computer program stored in a working memory of a computer and including at least one section of code which, upon execution, causes implementation of the method as claimed in claim 1.

* * * * *